(12) United States Patent
Matile

(10) Patent No.: US 6,891,126 B2
(45) Date of Patent: May 10, 2005

(54) HIGH-SPEED LASER CUTTING METHOD WITH ADAPTED GAS

(75) Inventor: Olivier Matile, Paris (FR)

(73) Assignee: L'Air Liquide, Societe Anonyme pour l'etude et l'Exploitation des Procedes Georges Claude, Paris (FR)

( * ) Notice: Subject to any disclaimer, the term of this patent is extended or adjusted under 35 U.S.C. 154(b) by 47 days.

(21) Appl. No.: 10/416,421
(22) PCT Filed: Nov. 8, 2001
(86) PCT No.: PCT/FR01/03469

§ 371 (c)(1),
(2), (4) Date: May 8, 2003

(87) PCT Pub. No.: WO02/38325
PCT Pub. Date: May 16, 2002

(65) Prior Publication Data
US 2004/0026387 A1 Feb. 12, 2004

(30) Foreign Application Priority Data
Nov. 9, 2000 (FR) .................................. 00 14407

(51) Int. Cl.⁷ ............................................. B23K 26/38
(52) U.S. Cl. ............................. 219/121.72; 219/121.84
(58) Field of Search ........................ 219/121.67, 121.68, 219/121.69, 121.7, 121.71, 121.72, 121.84

(56) References Cited

U.S. PATENT DOCUMENTS

| 4,010,345 A | * | 3/1977 | Banas et al. | ........... 219/121.84 |
| 4,773,864 A | * | 9/1988 | Holt | ........................ 434/262 |
| 5,250,784 A | * | 10/1993 | Muller et al. | ........ 219/121.72 |
| 5,578,228 A | * | 11/1996 | Beyer et al. | ........... 219/121.72 |
| 5,734,146 A | * | 3/1998 | La Rocca | ............. 219/121.72 |
| 5,770,833 A | * | 6/1998 | Kanaoka et al. | ...... 219/121.67 |
| 6,060,687 A | * | 5/2000 | Faerber | ................ 219/121.84 |
| 6,204,475 B1 | * | 3/2001 | Nakata et al. | ......... 219/121.84 |
| 6,313,432 B1 | * | 11/2001 | Nagata et al. | ......... 219/121.67 |
| 6,521,864 B2 | * | 2/2003 | Bertez et al. | .......... 219/121.72 |

FOREIGN PATENT DOCUMENTS

| DE | 41 123 716 | | 1/1993 |
| EP | 1149659 A | * | 10/2001 |
| JP | 11314191 A | * | 11/1999 |
| WO | WO000238325 A1 | * | 5/2002 |

* cited by examiner

*Primary Examiner*—Samuel M. Heinrich
(74) *Attorney, Agent, or Firm*—Linda K. Russell

(57) ABSTRACT

The invention concerns a method for cutting a metal or metal alloy workpiece using at least a laser beam and at least an assist gas of said laser beam wherein the assist gas consists of a mixture of helium and argon and/or nitrogen or of nitrogen and oxygen and the cutting speed is faster than 15 m/min. The thickness of the workpiece to be cut ranges between 0.5 mm and 10 mm, preferably more than 0.5 mm. The workpiece to be cut is selected among plates, metal sheets and tubes. The laser beam is delivered by a $CO_2$ type or YAG:Nd laser device.

17 Claims, No Drawings

HIGH-SPEED LASER CUTTING METHOD WITH ADAPTED GAS

The present invention relates to a high-speed laser beam cutting method using a lens to focus the laser beam and a laser beam assist gas.

In laser cutting, for low cutting speeds, that is to say typically less than 15 m/min, it is known that the cutting profile is simple and the molten metal is removed along the axis of the beam.

However, for cutting carried out at higher speed, that is to say above 15 m/min, it has been demonstrated that a gaseous plasma appears in the region of the cut kerf being formed, limiting the cutting performance on thin sheets, that is to say limiting it to less than 2 m/min.

These two types of phenomenon are described for example in documents U.S. Pat. No. 5,578,228, DE-A-41 123 716 or in "High Speed Laser Cutting of Thin Metal Sheets", by K. U. Preissig and, Fraunhofer Institut für Lasertechnik, SPIE Vol. 2207, 1996.

The formation of this plasma is explained by the movements induced in the cutting profile. This is because the hydrodynamic movements that are generated during cutting cause the molten metal to be removed to the rear of the cutting profile.

Consequently, the cutting profile may be considered as being formed from two parts, namely a nonemerging part, relating to a vapor capillary as in the case of high energy density cutting methods, and an emerging part, via which the removal of the molten metal takes place.

One may therefore make the analogy between the capillary formed in high energy density welding, for example plasma welding in keyhole mode (emerging weld), and the capillary formed in high-speed laser welding.

This is because, owing to the high specific power levels, production of the laser beam weld relies on localized melting phenomena in which the material melts at the point of impact of the beam where a "keyhole" capillary forms, this being filled with high-temperature ionized metal vapor. The walls of this capillary are formed from molten metal.

This capillary has an important role, as it allows the energy to be transferred directly to the core of the material.

The weld pool thus formed and sustained, and is moved between the workpieces to be joined.

The metal solidifies after the beam has passed, thus joining the workpieces together.

In other words, the appearance of the capillary is accompanied by the formation of a metal vapor plasma, that is to say an ionized gaseous medium that is electrically neutral and at high temperatures.

This metal vapor plasma results from effective coupling between the laser beam and the workpiece.

This type of plasma absorbs a small amount of the incident energy but does not appreciably modify the width and the depth of the weld bead.

Under certain conditions, especially those relating to power, speed, thickness, nature of the gas and configuration, the metal vapor plasma transfers some of its energy to the shielding gas and there is a risk of a shielding gas plasma being formed, which may, in certain cases, absorb the energy of the laser beam, thereby producing a weld bead which is wider on the surface and has penetrated the material much less.

The problem that then arises is therefore to avoid the formation of a shielding gas plasma.

To do this, it has already been proposed to use helium, which is reputed to be the most appropriate gas for limiting the appearance of this type of plasma.

However, this gas has the drawback of having a relatively low density compared with other gases, and this limits the kinetic effect and leads to the use of relatively high cutting pressures.

The object of the present invention is therefore to improve the known laser beam cutting methods by providing a laser cutting method in which the use of a judicious gas mixture makes it possible to limit the formation of said undesirable plasma and thus improve the kinetic energy of the gas flow so as to allow laser beam cutting at high speeds, typically greater than 15 m/min.

The present invention therefore relates to a method of cutting a workpiece made of metal or a metal alloy by using at least one laser beam and at least one assist gas for said laser beam, characterized in that the assist gas is formed from a helium/argon and/or helium/nitrogen or nitrogen/oxygen mixture and in that the cutting speed is greater than 15 m/min.

Depending on the case, the method of the invention may include one or more of the following features:

- the cutting speed is greater than 18 m/min, preferably greater than 20 m/min, and more preferably greater than 25 m/min;
- the cutting speed is less than 300 m/min;
- the assist gas is formed from a helium/argon, helium/nitrogen or nitrogen/oxygen mixture;
- the assist gas consists of a helium/argon mixture containing (by volume) 20% to 80% helium, preferably 25 to 75% helium, the remainder being argon;
- the assist gas is formed from a helium/nitrogen mixture containing (by volume) 20% to 80% helium, preferably 25 to 75% helium, the remainder being nitrogen;
- the assist gas is formed from a nitrogen/oxygen mixture containing (by volume) 0.5% to 40% oxygen, preferably 1 to 20% oxygen, the remainder being nitrogen;
- the thickness of the workpiece to be cut is between 0.05 mm and 5 mm, preferably greater than 0.1 mm;
- the workpiece to be cut is chosen from plates, sheets and tubes;
- the laser beam is delivered by a laser device of the $CO_2$ type or of the Nd:YAG type;
- a nozzle having an internal diameter between 0.5 mm and 10 mm, preferably between 1 mm and 3 mm, is used;
- the optical means for focusing the laser beam is chosen from lenses, mirrors and combinations thereof, preferably a lens;
- a laser source producing between 500 and 6 000 watts of power is used; and
- the workpiece to be cut is chosen from plates, sheets and tubes.

A better understanding of the present invention will now be gained from the following explanations, given by way of illustration but implying no limitation.

Within the context of the invention, it has been demonstrated that, to remedy or minimize the undesirable formation of a shielding gas plasma, it is necessary to use a gas having a high ionization potential (in eV), that is to say one preferably containing helium. The ionization potentials of the various gases are given in Table I below.

TABLE I

Ionization potentials of the gases

| Gas | Ionization potential (in eV) |
| --- | --- |
| Helium | 24.46 |
| Argon | 15.68 |
| Nitrogen | 15.51 |
| Hydrogen | 15.43 |
| Oxygen | 12.50 |

However, should we abide by this criterion, helium would actually be the best of the gases to be used.

However, as mentioned above, this is insufficient as helium has the drawback of having a relatively low density, thereby limiting the kinetic effect and leading to the use of relatively high cutting pressures.

Consequently, the inventor of the present invention has demonstrated that the other parameter to be taken into account in high-speed laser cutting is the density of the gas since, for small thicknesses (typically 0.1 mm to 2 mm), the metal expulsion aspect is predominant over the exothermic aspect as, owing to the relatively high cutting speeds, the reaction time is limited.

In fact, if we firstly consider the kinetic energy ($E_k$) of the gas stream used during laser cutting, this is given by the following formula (1):

$$E_k = \tfrac{1}{2}\rho V^2 \quad (1)$$

where $\rho$ is the density of the gas (in kg/m$^3$) and $V^2$ is the square of the velocity of said gas (in m/s).

Now, the speed depends on the flow rate (q) and on the diameter (D) of the nozzle used to expel the cutting gas, i.e.:

$$V = q/(\pi(D^2/4)) \quad (2)$$

This then gives the following equation (3):

$$E_k = f(\rho, q^2, 1/D^4) \quad (3)$$

In other words, the kinetic energy of the gas depends on the flow rate, and therefore the gas pressure, on the diameter of the nozzle and on the density of the gas.

To increase the cutting speed, a high density is therefore required.

The densities, at 15° C. and 1.013 bar, of the various gases of Table I are given in Table II below.

TABLE II

Densities of the gases

| Gas | Gas density (in kg/m$^3$) |
| --- | --- |
| Helium | 0.169 |
| Argon | 1.69 |
| Nitrogen | 1.17 |
| Hydrogen | 0.085 |
| Oxygen | 1.35 |

It is therefore apparent from Tables I and II that the mixtures particularly suitable for laser beam cutting at high speed (>15 m/s) are helium/argon and/or helium/nitrogen mixtures, which combine the high ionization potential of helium with the high gas densities of argon and/or nitrogen.

Less preferably, nitrogen/oxygen mixtures could also be suitable.

What is claimed is:

1. A method of cutting a workpiece made of metal or a metal alloy by using at least one laser beam and at least one assist gas for said laser beam, wherein the assist gas is formed from a helium/argon and/or helium/nitrogen or nitrogen/oxygen mixture and in that the cutting speed is greater than about 15 m/min.

2. The method as claimed in claim 1, wherein the cutting speed is greater than 18 m/min.

3. The method as claimed in claim 2, wherein the cutting speed is greater than 20 m/min.

4. The method as claimed in one of claim 1, wherein the cutting speed is less than about 300 m/min.

5. The method as claimed in claim 1, wherein the assist gas is formed from a helium/argon, helium/nitrogen or nitrogen/oxygen mixture.

6. The method as claimed in claim 1, wherein the assist gas consists of a helium/argon mixture containing (by volume) about 20% to about 80% helium with the remainder being argon.

7. The method of claim 6, wherein the helium/argon mixture contains (by volume) from about 25 to about 75% helium.

8. The method as claimed in claim 1, wherein the assist gas is formed from a helium/nitrogen mixture containing (by volume) about 20% to about 80% helium with the remainder being nitrogen.

9. The method of claim 8, wherein the helium/nitrogen mixture contains (by volume) from about 25 to about 75% helium.

10. The method as claimed in claim 1, wherein the assist gas is formed from a nitrogen/oxygen mixture containing (by volume) from about 0.5% to about 40% oxygen with the remainder being nitrogen.

11. The method of claim 10, wherein the nitrogen/oxygen mixture contains (by volume) from about 1 to about 20% oxygen.

12. The method as claimed in claim 1, wherein the thickness of the workpiece to be cut is between about 0.05 mm and about 5 mm and/or in that the workpiece to be cut is chosen from plates, sheets and tubes.

13. The method of claim 12, wherein the thickness is greater than about 0.1 mm.

14. The method as claimed in claim 1, wherein the laser beam is delivered by a laser device of the CO$_2$ type or of the Nd:YAG type.

15. The method as claimed in claim 1, wherein a nozzle having an internal diameter between about 0.5 mm and about 10 mm is used.

16. The method as claimed in claim 14, wherein a nozzle having an internal diameter between about 0.5 mm and about 10 mm is used.

17. The method of claim 15, wherein the internal diameter is between about 1 mm and about 3 mm.

* * * * *